(12) United States Patent
Chang (10) Patent No.: US 7,862,192 B2
(45) Date of Patent: Jan. 4, 2011

(54) LIGHTING DEVICE

(75) Inventor: Shao-Han Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 106 days.

(21) Appl. No.: 12/319,040

(22) Filed: Dec. 31, 2008

(65) Prior Publication Data
US 2010/0027240 A1   Feb. 4, 2010

(30) Foreign Application Priority Data

Aug. 4, 2008 (CN) .................. 2008 1 0303372
Oct. 10, 2008 (CN) .................. 2008 1 0304867

(51) Int. Cl.
  *G09F 13/04*   (2006.01)
(52) U.S. Cl. .............. 362/97.3; 362/244; 362/311.02; 362/339; 362/620

(58) Field of Classification Search ............ 362/97.2, 362/97.3, 240, 244, 311.02, 339, 619, 620; 349/62, 66; 359/624
See application file for complete search history.

(56) References Cited

U.S. PATENT DOCUMENTS

| 7,726,827 | B2 * | 6/2010 | Hsu et al. | 362/97.2 |
| 2009/0073723 | A1 * | 3/2009 | Hsu et al. | 362/339 |
| 2010/0033952 | A1 * | 2/2010 | Chang | 362/97.1 |

* cited by examiner

*Primary Examiner*—Stephen F Husar
(74) *Attorney, Agent, or Firm*—Clifford O. Chi (57) ABSTRACT

A lighting device includes a housing, a plurality of LEDs arranged on a base of the housing, and a first optical plate positioned above the LEDs. The first optical plate includes a light input surface, a light output surface opposite to the light input surface, and a plurality of V-shaped ridges aligned in at least two different directions formed on the light output surface. The V-shaped ridges aligned in different directions intersect with one another. The lighting device may be used as a backlight module.

14 Claims, 7 Drawing Sheets

LIGHTING DEVICE

BACKGROUND

1. Technical Field

The present disclosure generally relates to lighting devices and, more particularly, to a lighting device using light emitting diodes (LEDs).

2. Discussion of the Related Art

LEDs are preferred over other types of light sources because LEDs exhibit low energy consumption, long service life, and other advantages.

Typically, a lighting device using LEDs includes a housing and a plurality of LEDs arranged on a base of the housing. Light rays from one LED of the lighting device irradiate an object from different directions. Therefore, a detecting surface may form multiple shadows of the object. Thus, a lighting quality is decreased.

Therefore, a new lighting device is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
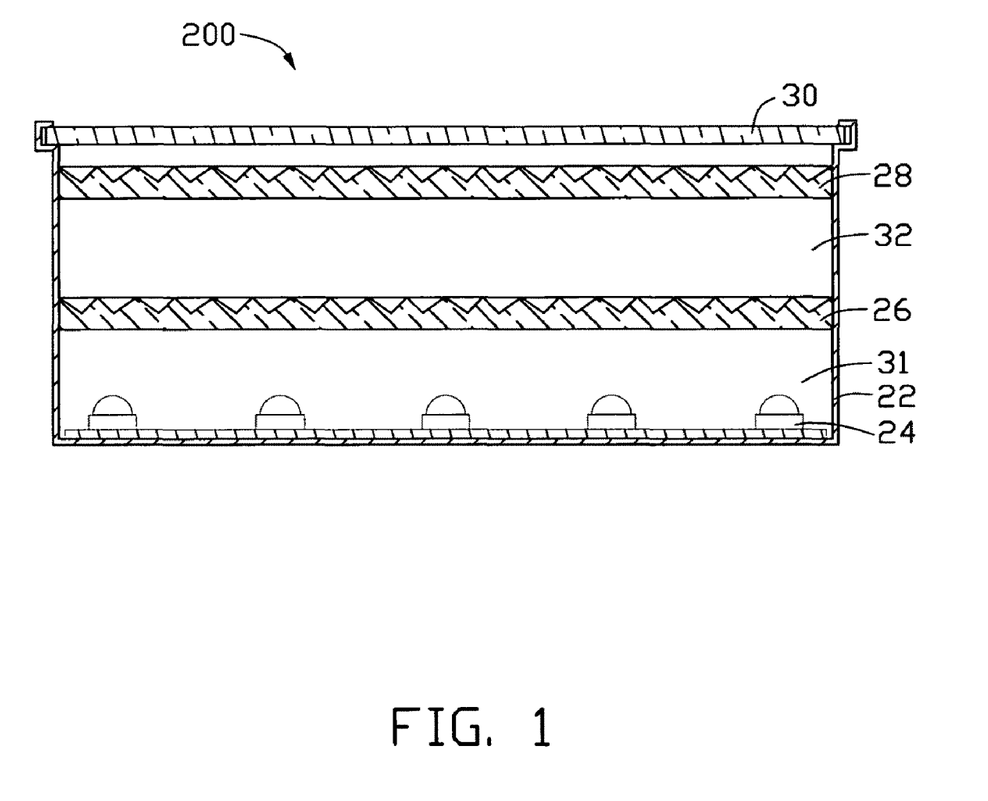
FIG. 1 is a cross-sectional view of a first embodiment of a lighting device, the lighting device including one embodiment of a first optical plate.

Referring to FIG. 1, a lighting device 200 includes a housing 22, a plurality of light emitting diodes (LEDs) 24, a first optical plate 26, a second optical plate 28, and a protecting plate 30. The LEDs 24 are arranged on a base of the housing 22. The first optical plate 26 is positioned above the LEDs 24. The second optical plate 28 is positioned above the first optical plate 26. The first optical plate 26 is at a predetermined distance from the base of the housing 22. The first optical plate 26 and the housing 26 cooperatively define a first light-mixing space 31. The second optical plate 28 is at a predetermined distance from the first optical plate 26, thereby defining a second light-mixing space 32 is defined between the first optical plate 26 and the second optical plate 28. The protecting plate 30 is positioned at a top of the housing 22.

The housing 22 may be made of metal or plastic materials having a highly reflectivity surface. Alternatively, an interior of the housing 22 may have a highly reflective coating to improve light reflectivity.

Figure 2:
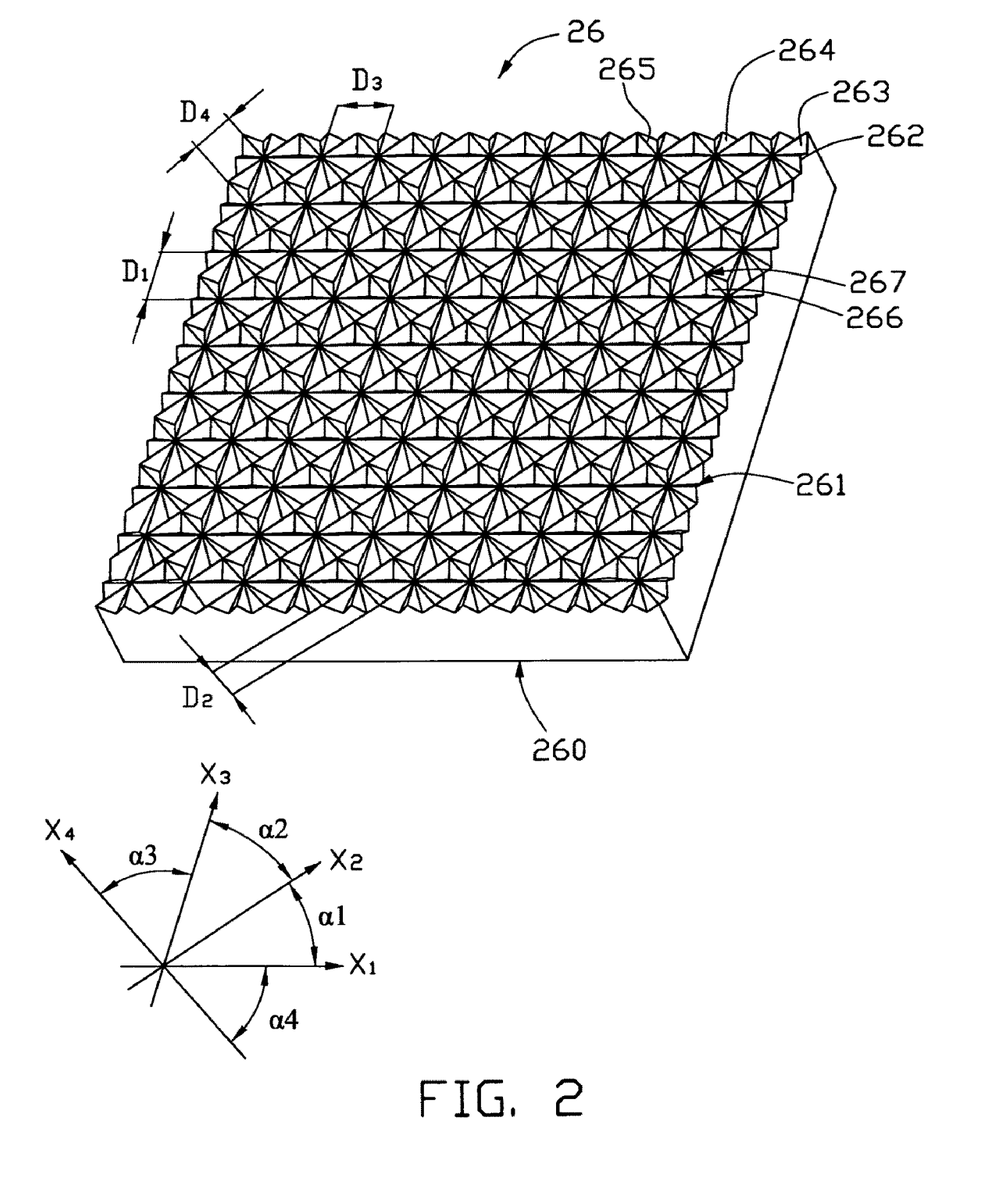
FIG. 2 is an isometric view of the first optical plate of the lighting device in FIG. 1.

Referring to FIG. 2, one embodiment of the first optical plate 26 has a light input surface 260 and a light output surface 261. The light input surface 260 is a flat surface facing the LEDs 24. The light output surface 261 of the first optical plate 26 faces away from the LEDs 24. Light enters the first optical plate 26 via the light input surface 260.

The light output surface 261 of the first optical plate 26 forms a plurality of first V-shaped ridges 262 aligned in a first direction $X_1$, a plurality of second V-shaped ridges 263 aligned in a second direction $X_2$, a plurality of third V-shaped ridges 264 aligned in a third direction $X_3$, and a plurality of fourth V-shaped ridges 265 aligned in a fourth direction $X_4$.

The first, second, third, and fourth V-shaped ridges 262, 263, 264, 265, intersect with one another. In other words, the first and third V-shaped ridges 262, 264 intersect one another and form a plurality of intersections. The second and the fourth V-shaped ridges 263, 265 respectively pass through the intersections of the first and the third V-shaped ridges 262, 264.

A first angle $\alpha_1$ is defined between the first direction $X_1$ and the second direction $X_2$. A second angle $\alpha_2$ is defined between the second direction $X_2$ and the third direction $X_3$. A third angle $\alpha_3$ is defined between the third direction $X_3$ and the fourth direction $X_4$. A fourth angle $\alpha_4$ is defined between the fourth direction $X_4$ and the first direction $X_1$. In the illustrated embodiment, the first, second, third, and fourth angles $\alpha_1, \alpha_2, \alpha_3, \alpha_4$ are all about 45 degrees.

A vertex angle of the first, second, third, and fourth V-shaped ridges 262, 263, 264, 265, taken along a plane perpendicular to an extending direction of the corresponding V-shaped ridge is about 80 degrees to about 100 degrees. A pitch of the adjacent V-shaped ridges aligned in the same direction is about 0.025 millimeters (mm) to about 1 mm.

In the illustrated embodiment, the first, second, third, and fourth V-shaped ridges 262, 263, 264, 265, may be determined by the formula: $D_1 = D_3 = \sqrt{2} D_2 = \sqrt{2} D_4$, where $D_1$ represents a pitch of adjacent first V-shaped ridges 262, $D_2$ represents a pitch of adjacent second V-shaped ridges 263, $D_3$ represents a pitch of adjacent third V-shaped ridges 264, and $D_4$ represents a pitch of adjacent fourth V-shaped ridges 265.

The first, second, third, and fourth V-shaped ridges 262, 263, 264, 265, intersect with one another, thereby defining a plurality of triangular pyramid depressions 266 in the light output surface 261. The triangular pyramid depressions 266 are arranged in a matrix manner and closely connected. Four triangular pyramid depressions 266 together with the sidewalls thereof cooperatively form a four-pointed star 267.

A thickness of the first optical plate 26 may be about 0.4 mm to about 4 mm. The first optical plate 26 may be made of polycarbonate, polymethyl methacrylate, polystyrene, copolymer of methyl methacrylate and styrene, and any combination thereof. The first optical plate 26 may be integrally formed, such as by injection molding technology.

The structure and material of the second optical plate 28 may be the same as that of the first optical plate 26. In the illustrated embodiment, a plurality of microstructures (not labeled) may be formed on a light output surface of the second optical plate 28.

The protecting plate 30 is a transparent plate, and may be made of a translucent material, such as glass or plastic. The protecting plate 30 prevents dust from entering the lighting device 200. The protecting plate 30 also prevents microstructures on a light output surface of the second optical plate 28 from being damaged.

The first optical plate 26 and the second optical plate 28 are received in the housing 22. The first optical plate 26 and the second optical plate 28 may adhere to a sidewall of the housing 22, or be supported by a bracket.

The predetermined distance between the first optical plate 26 and the base of the housing 22, and the predetermined distance between the second optical plate 28 and the first optical plate 26 may vary. Assuming a same uniformity of the output light, a depth of the housing 22 is inversely proportional to an amount of the LEDs 24. When the number of the LEDs 24 is large, the depth of the housing 22 is low, the predetermined distance between the first optical plate 26 and the base of the housing 22, and the predetermined distance between the second optical plate 28 and the first optical plate 26 is short. When the amount of the LEDs 24 is small, the depth of the housing 22 is high, the predetermined distance between the first optical plate 26 and the base of the housing 22, and the predetermined distance between the second optical plate 28 and the first optical plate 26 is long.

Figure 3:
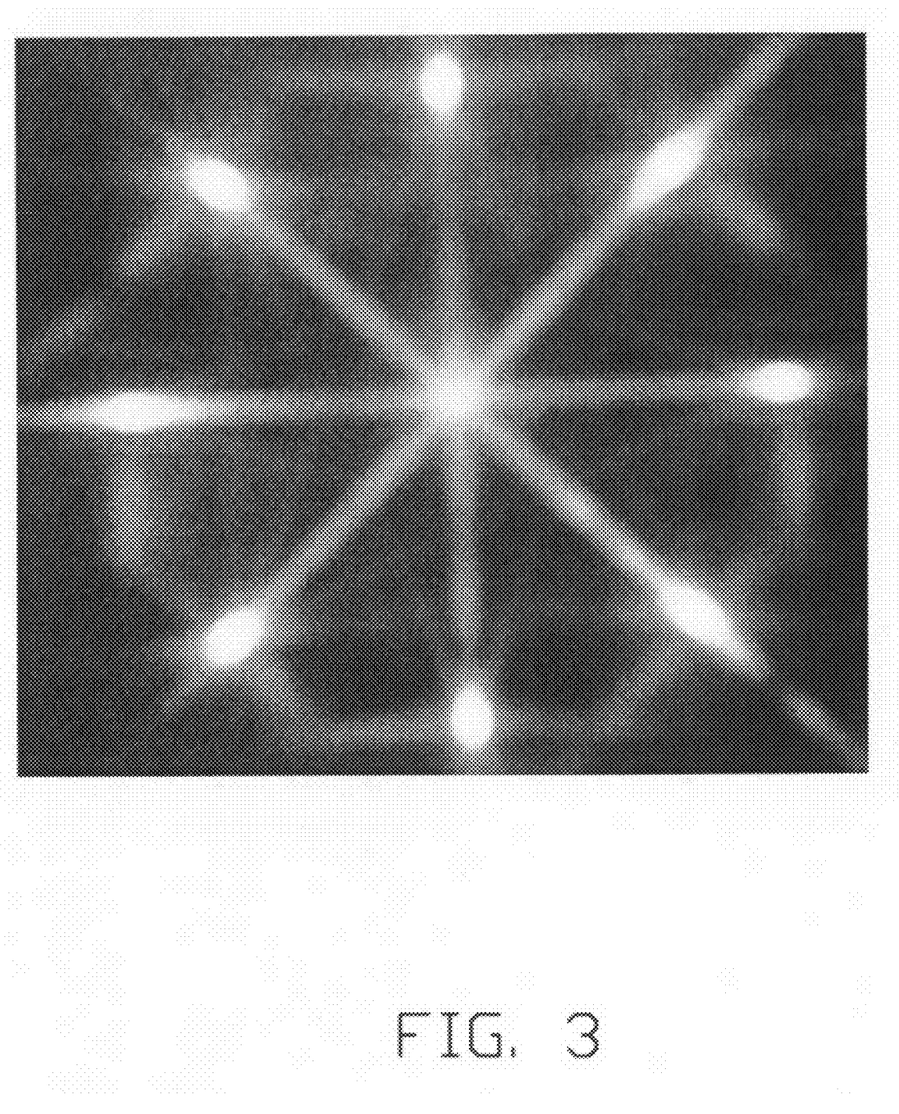
FIG. 3 is a photo showing an illumination distribution of the lighting device using the first optical plate of FIG. 2.

Referring to FIG. 1 again, light from the LEDs 24 is diffused in the first light-mixing space 31. When the light travels through the first optical plate 26, the light is refracted, reflected, and diffracted due to the plurality of triangular pyramid depressions 266. Referring to FIG. 3, the light emitted from the first optical plate 26 forms a plurality of smaller light spots according to each of the LEDs 24. Thus, a relatively uniform surface light source is achieved.

After travelling through the first optical plate 26, the light is diffused in the second light-mixing space 32. The light is refracted, reflected, and diffracted via the second optical plate 28. Therefore, strong light spots of the light sources seldom occurs, and a more uniform light is achieved.

When the lighting device 200 is used to illuminate an object, light rays from the lighting device 200 irradiate the object from the same direction. Thus, a detecting surface forms a single shadow of the object.

Figure 4:
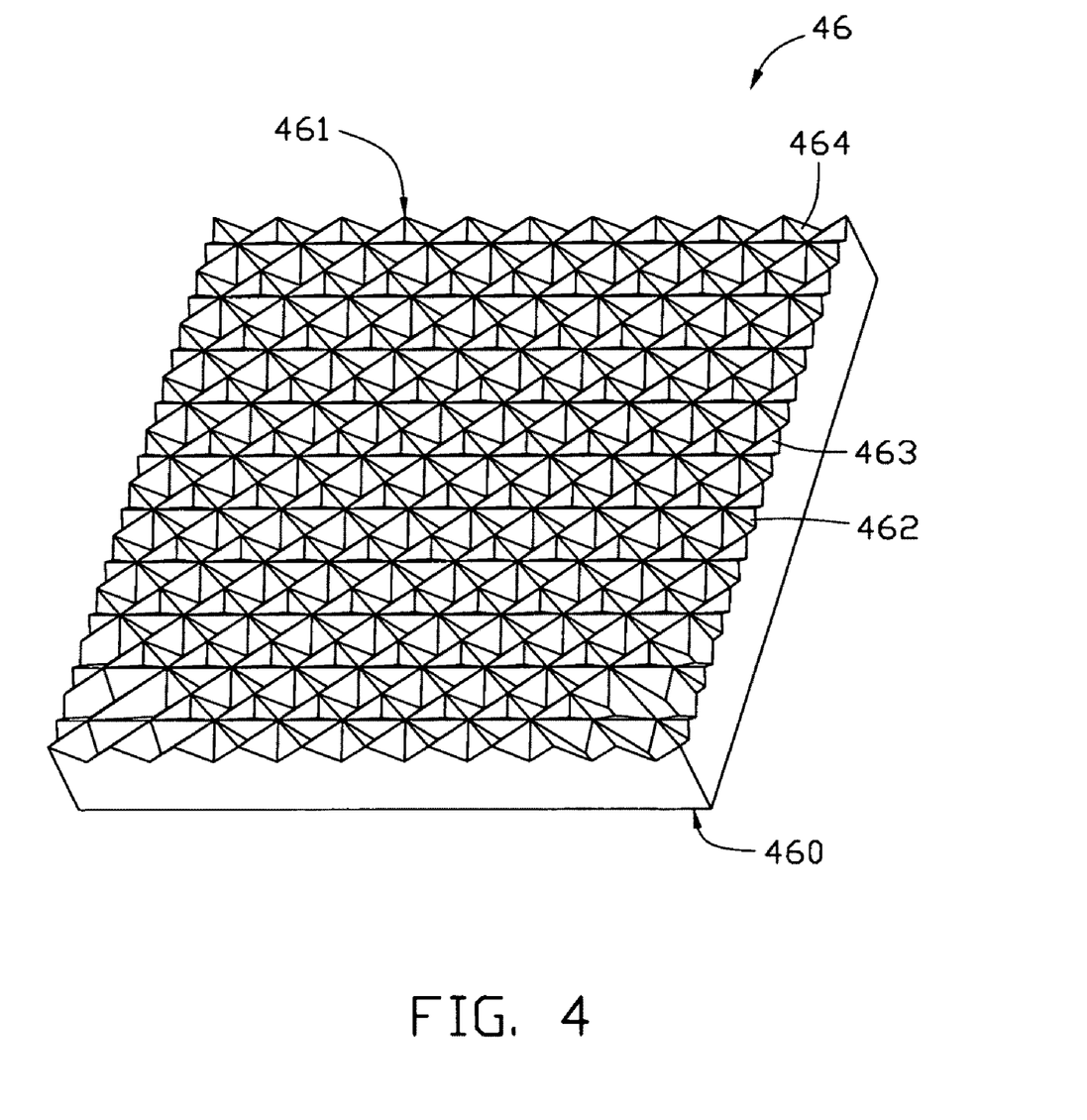
FIG. 4 is an isometric view of another embodiment of a first optical plate.

Referring to FIG. 4, another embodiment of a first optical plate 46 is similar to one embodiment of the first optical plate 26, except that a light output surface 461 of the first optical plate 46 forms a plurality of first V-shaped ridges 462 aligned in a first direction, a plurality of second V-shaped ridges 463 aligned in a second direction, and a plurality of third V-shaped ridges 464 aligned in a third direction. The first, second, and third V-shaped ridges 462, 463, 464, intersect with one another. The V-shaped ridges aligned in two different directions intersect with one another and form a plurality of intersections, and the V-shaped ridges aligned in the other direction pass through the intersections.

A vertex angle of the first, second, and third V-shaped ridges taken along a plane substantially perpendicular to an extending direction of the corresponding V-shaped ridge is in the range from about 50 degrees to about 120 degrees.

Figure 5:
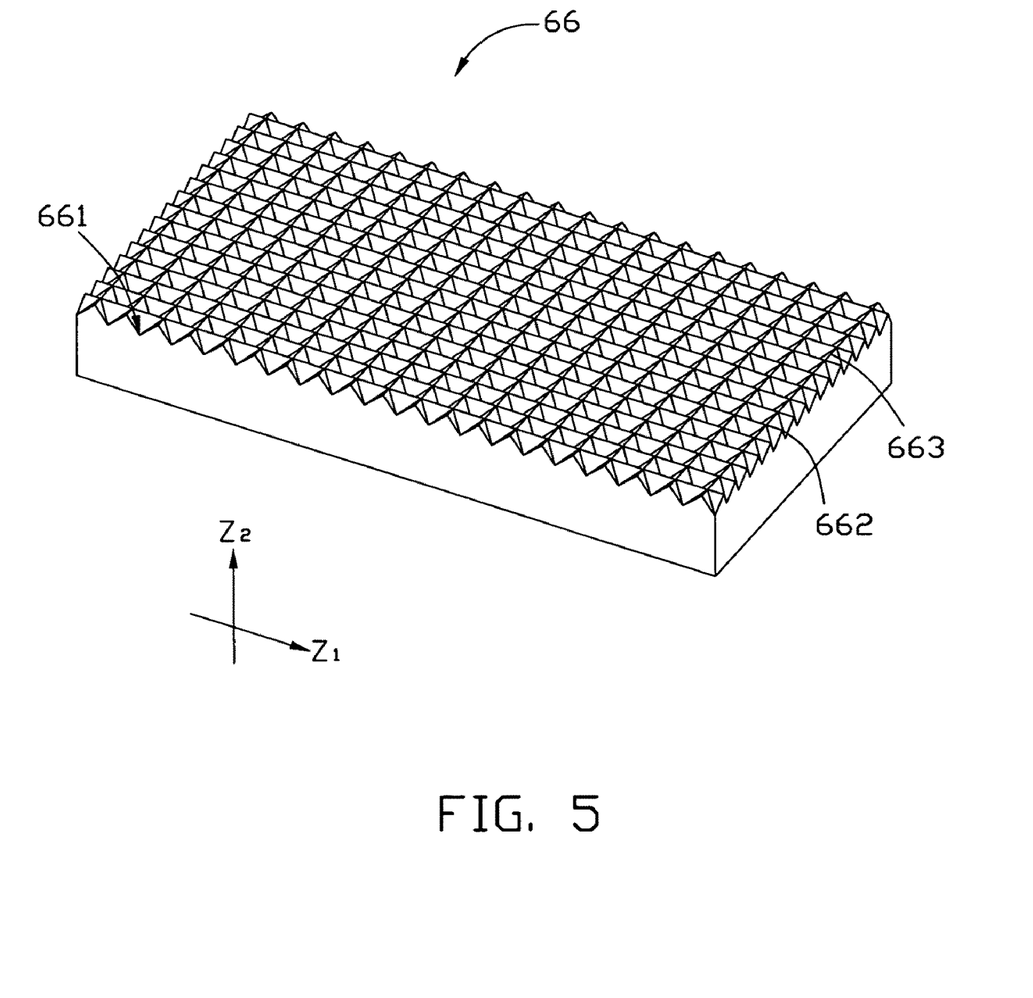
FIG. 5 is an isometric view of yet another embodiment of a first optical plate.

Referring to FIG. 5, yet another embodiment of a first optical plate 66 is similar to the first optical plate 26, except that a light output surface 661 of the first optical plate 66 forms a plurality of first V-shaped ridges 662 aligned in a first direction $Z_1$ and a plurality of second V-shaped ridges 663 aligned in a second direction $Z_2$. The first V-shaped ridges 662 perpendicularly intersect with the second V-shaped ridges 663.

The structure of the second optical plate 28 of the lighting device 200 may be the same as the structure of the first optical plates 26, 46, 66. For example, the second optical plate 28 forms a plurality of V-shaped ridges aligned in at least two different directions intersecting with one another.

The structure of the first optical plate 26, 46, 66 may also be different from that of the second optical plate 28. For example, if the light output surface 261 of the first optical plate 26 forms a plurality of V-shaped ridges aligned in four different directions, a light output surface of the second optical plate may form a plurality of V-shaped ridges aligned in three different directions or two different directions.

In an alternative embodiment, the second optical plate 28 may be omitted.

Figure 6:
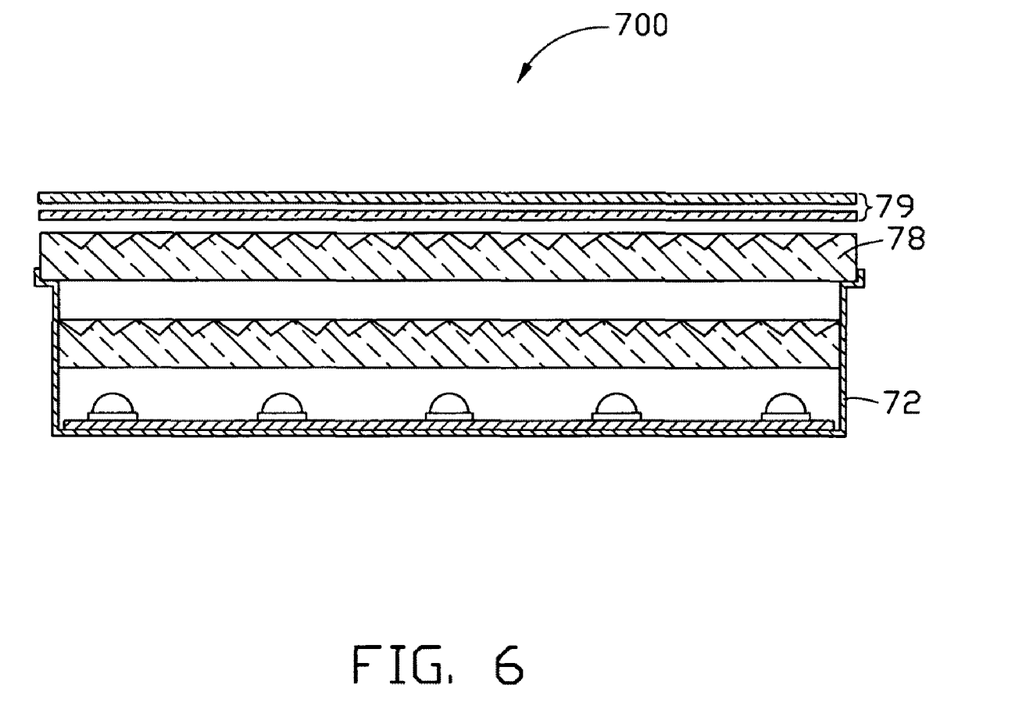
FIG. 6 is a cross-sectional view of a second embodiment of a lighting device.

Referring to FIG. 6, a second embodiment of a lighting device 700 is similar in principle to the first embodiment of the lighting device 200, except that a second optical plate 78 is positioned at a top of a housing 72 and a plurality of optical sheets 79 are positioned on the second optical plate 78. The optical sheets 79 may be diffusion sheets, prism sheets, or reflective polarizing sheets. The optical sheets 79 collimate emitted light, thereby improving the light illumination brightness. Alternatively, the optical sheets 79 may be omitted.

Figure 7:
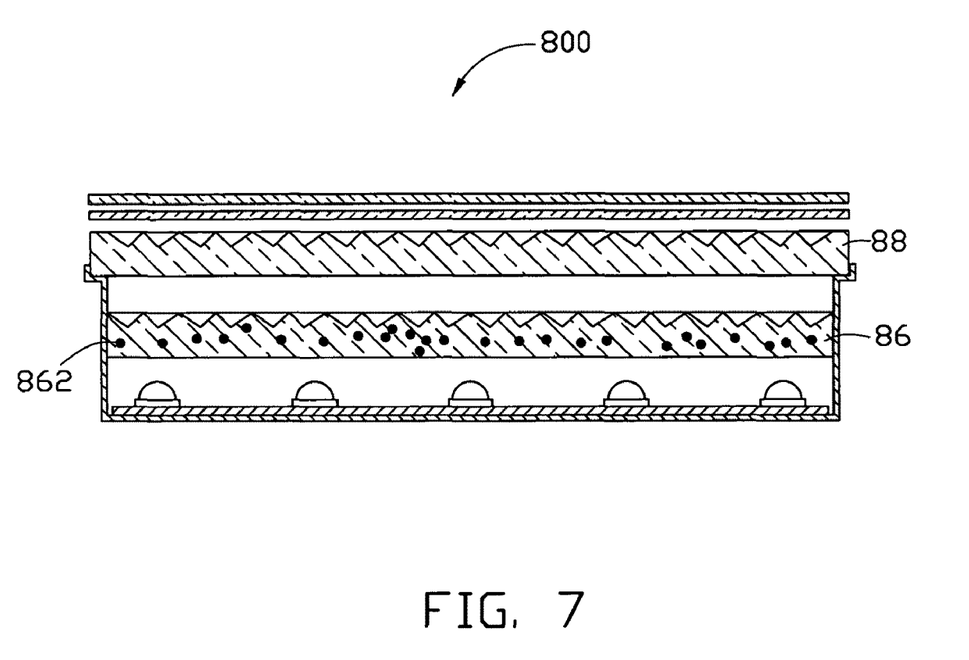
FIG. 7 is a cross-sectional view of a third embodiment of a lighting device.

Referring to FIG. 7, a third embodiment of a lighting device 800 is similar in principle to the second embodiment of the lighting device 700, except that a plurality of diffusion particles 862 is dispersed in a first optical plate 86.

The diffusion particles 862 may be made of titanium dioxide, silicon dioxide, acrylic resin, and any combination thereof. The diffusion particles 862 scatter light and enhance the light distribution capability of the first optical plate 86. When light travels through the first optical plate 86, more uniform light is achieved. In an alternative embodiment, the diffusion particles 862 may be dispersed in a second optical plate 88.

The lighting device 700 may be used as a backlight module in a liquid crystal display. When the lighting device 700, 800 is used as the backlight module, the backlight module may have a thin thickness and an output light of the backlight module is uniform.

It is believed that the present embodiments and their advantages will be understood from the foregoing description, and it will be apparent that various changes may be made thereto without departing from the spirit and scope of the embodiments or sacrificing all of its material advantages, the examples hereinbefore described merely being preferred or exemplary embodiments.

What is claimed is:

1. A lighting device, comprising:
   a housing;
   a plurality of LEDs arranged on a base of the housing;
   a first optical plate positioned above the LEDs, the first optical plate comprising:
      a light input surface;
      a light output surface opposite to the light input surface; and
      a plurality of V-shaped ridges aligned in at least two different directions formed on the light output surface; and
   a second optical plate positioned above the first optical plate, the second optical plate comprising:
      a light input surface;
      a light output surface; and
      a plurality of V-shaped ridges aligned in at least two different directions formed on the light output surface of the second optical plate, the at least two different directions intersecting with one another.

2. The lighting device of claim 1, wherein the at least two different directions of the V-shaped ridges of the first optical plate comprises two different directions intersecting with one another.

3. The lighting device of claim 1, wherein the at least two different directions of the V-shaped ridges of the first optical plate comprises three different directions, two different directions of the three different directions intersect with one another and form a plurality of intersections, and the other different direction of the three different directions pass through the intersections.

4. The lighting device of claim 1, wherein the at least two different directions of the V-shaped ridges of the first optical plate comprises four different directions, two different directions of the four different directions intersect with one another and form a plurality of intersections, and the other two different directions pass through the intersections.

5. The lighting device of claim 1, wherein the at least two different directions of the V-shaped ridges of the second optical plate comprises two different directions intersecting with one another.

6. The lighting device of claim 1, wherein the at least two different directions of the V-shaped ridges of the second optical plate comprises three different directions, two different directions of the V-shaped ridges of the second optical plate intersect with one another and form a plurality of intersections, and the other different direction of the V-shaped ridges of the second optical plate pass through the intersections.

7. The lighting device of claim 1, wherein the at least two different directions of the V-shaped ridges of the second optical plate comprises four different directions, two different directions of the V-shaped ridges of the second optical plate intersect with one another and form a plurality of intersections, and the other two different directions of the V-shaped ridges of the second optical plate pass through the intersections.

8. The lighting device of claim 1, wherein the first optical plate and the second optical plate are made of a material selected from the group consisting of polycarbonate, polymethyl methacrylate, polystyrene, copolymer of methyl methacrylate and styrene, and any combination thereof.

9. The lighting device of claim 1, further comprising a protecting plate positioned at a top of the housing.

10. A backlight module, comprising:
a housing;
a plurality of LEDs arranged on a base of the housing; and
a first optical plate and a second optical plate orderly positioned above the LEDs, the first optical plate and the second optical plate each comprising:
a light input surface;
a light output surface opposite to the light input surface; and
a plurality of V-shaped ridges aligned in at least two different directions being formed on the light output surface.

11. The backlight module of claim 10, wherein the second optical plate is positioned at a top of the housing, and at least one optical sheet positioned on the second optical plate.

12. The backlight module of claim 10, wherein the first optical plate further comprises a plurality of diffusion particles uniformly dispersed in the first optical plate.

13. The backlight module of claim 10, wherein the first optical plate is at a predetermined distance from the base of the housing, the first optical plate and the housing cooperatively define a first light-mixing space.

14. The backlight module of claim 13, wherein the second optical plate is at a predetermined distance from the first optical plate, and a second light-mixing space is defined between the first optical plate and the second optical plate.

* * * * *